US006966350B1

(12) United States Patent
    Gist

(10) Patent No.: US 6,966,350 B1
(45) Date of Patent: Nov. 22, 2005

(54) POWER TOOL SUPPORTING CABINET WITH A DETACHABLE DUST BIN

(75) Inventor: Leslie Daily Gist, Jackson, TN (US)

(73) Assignee: Delta International Machinery Corp., Jackson, TN (US)

( * ) Notice: Subject to any disclaimer, the term of this patent is extended or adjusted under 35 U.S.C. 154(b) by 162 days.

(21) Appl. No.: 10/254,712

(22) Filed: Sep. 25, 2002

(51) Int. Cl.$^7$ .............................. B25H 1/02; B25H 1/12
(52) U.S. Cl. ...................... 144/285; 144/286.5; 83/471
(58) Field of Search .............................. 144/285, 286.1, 144/286.5, 287; 83/469, 471, 497, 479.2, 83/477.1; 108/25, 26, 33, 38, 40, 59, 60, 108/64; 312/237, 283, 286, 249.1, 249.4, 312/249.8, 249.11

(56) References Cited

U.S. PATENT DOCUMENTS

| | | | | |
|---|---|---|---|---|
| 3,547,506 A | * | 12/1970 | Larking .......................... 312/222 |
| 4,408,642 A | * | 10/1983 | Jeruzal et al. ................ 144/286.5 |
| 4,483,573 A | * | 11/1984 | Keller ............................. 312/281 |
| 4,599,927 A | * | 7/1986 | Eccardt et al. ..................... 83/473 |
| 5,224,531 A | * | 7/1993 | Blohm ............................ 144/285 |
| 5,642,898 A | * | 7/1997 | Wise ............................... 280/652 |
| 6,131,629 A | * | 10/2000 | Puzio et al. ................. 144/252.1 |
| 6,253,757 B1 | * | 7/2001 | Benson ............................ 125/35 |
| 6,688,350 B2 | * | 2/2004 | Heinlen et al. ................ 144/285 |
| 2002/0184982 A1 | * | 12/2002 | Smith et al. ....................... 83/39 |

* cited by examiner

Primary Examiner—Allen Ostrager
Assistant Examiner—Shelley Self
(74) Attorney, Agent, or Firm—Suiter West PC LLO

(57) ABSTRACT

A cabinet for supporting a platform for a power tool has a body constructed with three or more substantially vertical surfaces. One of the surfaces allows insertion of a removable dustbin. The removable dustbin may have a handle or recess to aid in insertion and removal and may have a window. One of the surfaces allows access to storage compartments, such as a blade/dado storage compartment, an inserts compartment, and a storage shelf compartment.

13 Claims, 6 Drawing Sheets

POWER TOOL SUPPORTING CABINET WITH A DETACHABLE DUST BIN

FIELD OF THE INVENTION

The present invention generally relates to the field of support and storage structures, and particularly to a cabinet having storage compartments and a removable dustbin and upon which is mounted a platform for operating a power tool.

BACKGROUND OF THE INVENTION

Work cabinets are used for mounting power tool platforms. The power tools, especially saws and drills, produce debris that falls into the cabinet. Current cabinets allow the debris to just fall and accumulate on the floor. Over time, the debris builds up and needs to be disposed of. This buildup of debris has the potential of becoming a work hazard. For instance, fires may be more likely to occur if the debris build up is of a combustible material. Also, the debris may have a greater tendency to produce dust in the surrounding area of an enclosed work area so as to present a health hazard. Further, the debris buildup may actually cause the work cabinet to tilt.

Further, work cabinets have not been designed to maximize ergonomic benefits to the user. For instance, a user often has to travel away from the work cabinet to retrieve a tool from a toolbox or to find a schematic from a desk. This action of leaving the work cabinet area may be disruptive to maintaining a sufficient level of care for the work being performed. A temporary absence from the work area may result in a loss of the short-term memory used in performing tasks requiring concentration and continual sensory feedback.

Therefore, it would be desirable to provide a work cabinet that employs an efficient method for removing work debris and facilitate a user's access to tools, manuals, drawings, power tool components, and the like.

SUMMARY OF THE INVENTION

Accordingly, the present invention is directed to a cabinet for supporting a power tool work platform in which the cabinet has a removable dustbin for the collection of debris produced by operation of a power tool. The dustbin may have a trapezoidal, rectangular, triangular, or other shaped top opening and, preferably, has a window to facilitate determining when the debris buildup is sufficiently high for removal. Furthermore, the cabinet may have one or more compartments for the storage of work items, such as cutting blades, drill bits, manuals, and the like. For example, the compartments may include a blade/dado storage compartment, an inserts compartment, and a storage shelf compartment. The cabinet of the present invention provides an easily maintained and versatile workspace.

In a first aspect of the invention, a cabinet for supporting a power tool work platform has a three or more sided body that includes at least one storage compartment and a dustbin. The dustbin collects particulate debris produced by a power tool.

In a second aspect of the invention, a cabinet and work platform assembly includes a three-sided body, a dustbin insertable into and removable from the body, and a work platform mounted upon the body. The work platform supports a power tool.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
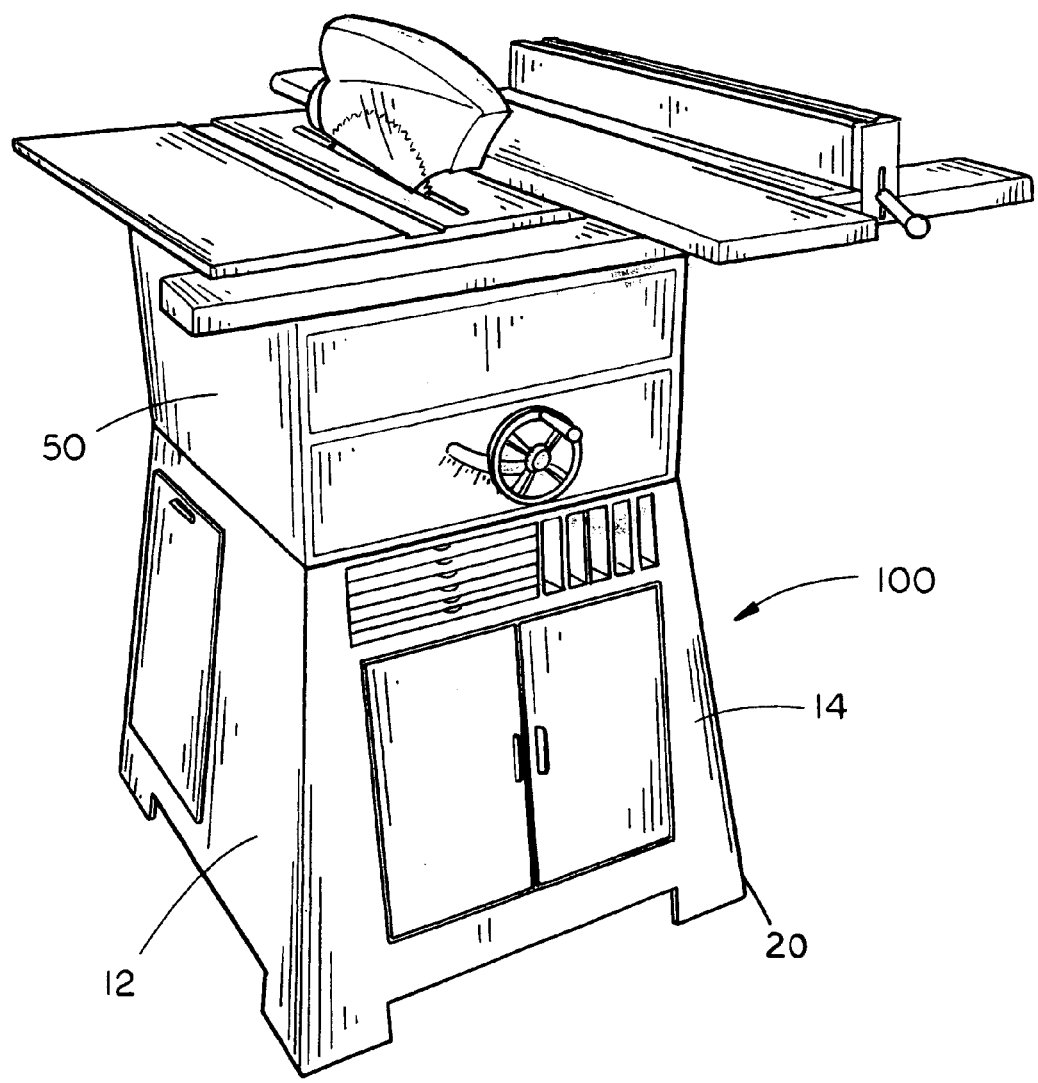
FIG. 1 illustrates an exemplary embodiment of the cabinet of the present invention supporting a power tool work platform.

The present invention relates to a cabinet that supports a work platform, such as a platform for a table saw. The cabinet of the present invention, preferably, includes a dustbin and user convenient storage compartments. Although a preferred embodiment in FIG. 1 of the cabinet 100 shows four side surfaces, the cabinet 100 may have three or five or more sides. The side surfaces are substantially rectangular, but may be squarish or trapezoidal, and may be oriented substantially vertical to a floor or other support surface upon which the cabinet rests. The cabinet body is formed of sheet metal, but may be formed of wood, plastic, or other sufficiently rigid, durable material. A work platform 50 rests upon and may be secured to the top of the cabinet 100. The work platform 50 may support a power tool, such as a drill or table saw.

The cabinet body has one or more openings for compartments or bins having various functions. Although a removable dustbin 90 is preferably disposed at the side 12 of the cabinet 100, the dustbin 90 may be disposed at a front or rear of the cabinet 100. A funneling or guiding structure, such as a blade and/or shroud, may be included within the cabinet body to direct the dust or debris into the dustbin. The front 14 of the cabinet 100 has defined sections that provide easy accessibility to various work materials for a user. For example, there may be a blade/dado storage compartment 80, an inserts compartment 60, and a shelf storage compartment 42. Other arrangements may be employed. For example, there may be a fourth storage compartment. Also, the compartments may be located at a side or at the rear of the cabinet. The shelf storage compartment 42 may be protected by doors 40 or other means. Supporting the weight of the cabinet 100 are legs 20 that extend downward in a flared or straight manner.

Figure 2:
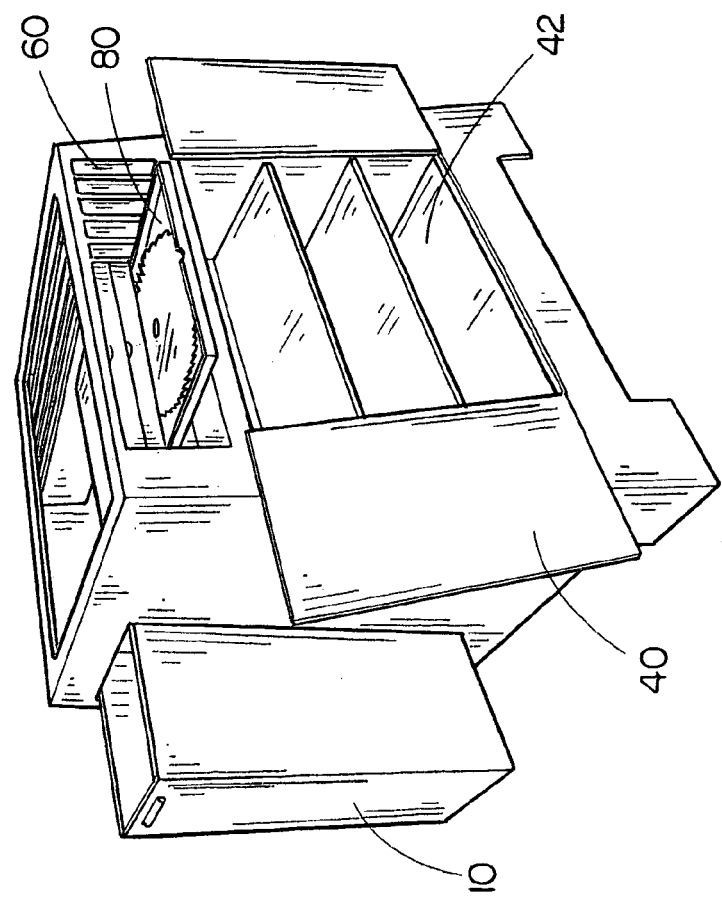
FIG. 2 illustrates an exposed view of the storage components and dustbin in an embodiment of the cabinet of the present invention.

FIG. 2 illustrates an open view of an embodiment of the cabinet. The doors 40 are hingeably attached to the front of the cabinet body. The doors preferably open away from the center of the front surface to reveal a storage compartment. Instead of hinged doors, sliding doors may be used. The storage compartment may be a shelf storage compartment having one or more shelves to provide storage space for items such as manuals. The shelves may be L shaped for easy removeability. Multiple shelf sizes may be available for customizing a cabinet.

Another exemplary embodiment of the cabinet includes wheels or castors attached to the cabinet corners. The wheels may be latchable so as to lock movement of the cabinet to two directions or may be lockable to completely prevent movement of the cabinet. Instead of or in addition to wheels, the cabinet may have pads. The pads may be adjustable so as to better stabilize the cabinet and work platform over uneven surfaces. The pads may even be used to selectively raise or lower portions of the cabinet to maintain an even or otherwise desired surface for the work platform.

Figure 3:
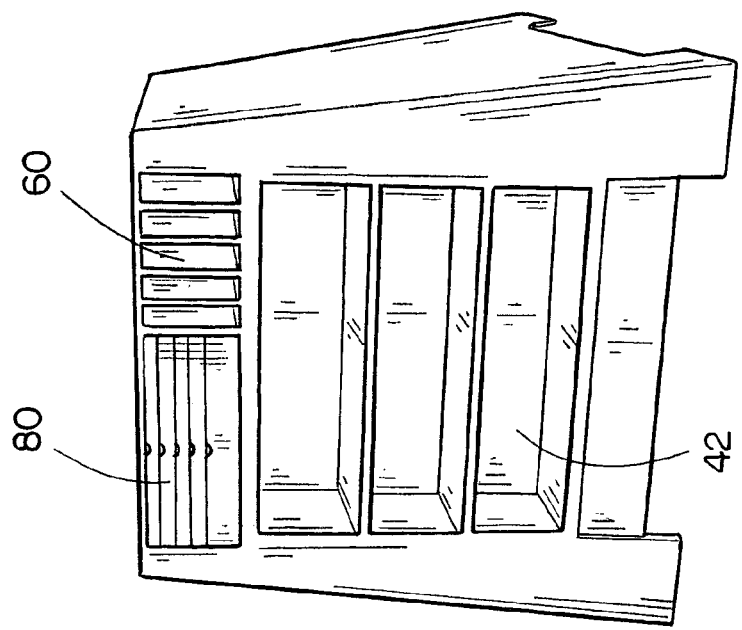
FIG. 3 illustrates a front view of an embodiment of the cabinet body of the present invention.

FIG. 3 illustrates a front view of an embodiment of the cabinet 100 without the doors 40 attached. The blade/dado compartment 80 includes one or more drawers. Instead of drawers, horizontal shelves or vertical dividers may be used. The shelf storage compartment 42 may be arranged to have a mixture of horizontal shelves and vertical dividers.

Although, preferably, the cabinet is constructed from bent sheets of metal of sufficient strength to support a work platform, an alternative manufacture may use a framework of interconnected posts or beams. The posts may be solid or hollow and may have cross sections that are circular, oval, square, or rectangular. Sheets of strong, rigid, and durable material, such as metal, plastic, or wood, are attached to the framework. The sheets, with or without a framework, may be secured by screws, glue, bolts, rivets, welded joints, and the like.

Enhanced structural strengthening members may be added to the cabinet. For example, reinforcing posts, beams, ribs, and the like may be mounted between the substantially vertical side surfaces and/or posts of the cabinet body. The reinforcing elements may even form a reinforcing structure which extends as a three dimensional matrix through large portions of the interior of the cabinet.

Figure 6:
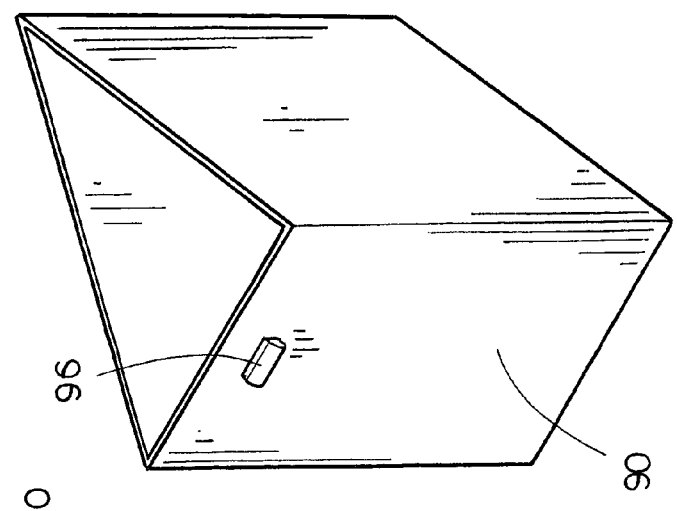
FIGS. 4–6 illustrate three different embodiments of the removable dustbin of the present invention.
Figure 5:
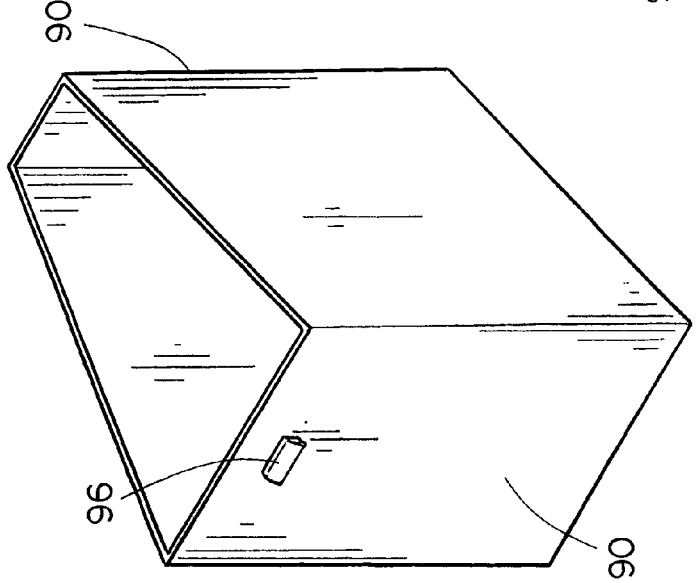
Figure 4:
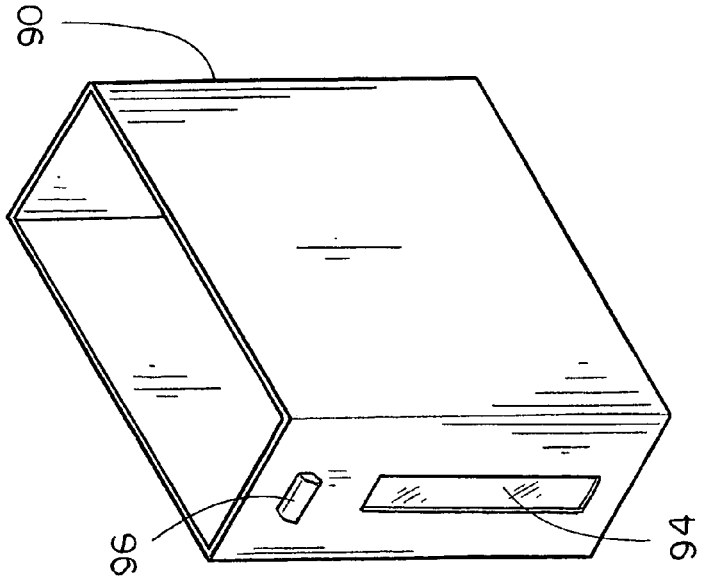

FIGS. 4–6 illustrate different embodiments of the detachable dustbin 90. In FIG. 4, the dustbin 90 has a rectangular body. A transparent or translucent window 94 is preferably disposed to allow a user to view the accumulated dust and material buildup inside. The window 94 may be formed of glass or plastic. Alternatively, for this purpose, the dustbin may be formed of a transparent or substantially transparent material. The dustbin 90 may be easily and accurately placed within the body of the cabinet 100 through rails or guides.

A handle 96 is attached to the dustbin 90 to allow easy removal from the cabinet 100. The handle 96 may be of various shapes and sizes. The handle may be designed to act as a latch to secure the dustbin to the cabinet. A grippable and/or contoured handle surface may be provided to facilitate removal. Grippability may be improved by abrading portions or the handle's entire surface. Instead of a handle, the dustbin 90 may have a recess that may be contoured or treated to facilitate gripping.

Furthermore, dustbin 90 may be lockable to secure the dustbin in place to prevent unwarranted movement that may occur during transportation or through the operation of power tools on the supported work platform. The locking mechanism may be operated by a key or through actuation by the handle 96. A latching bar may be used to straddle across the outside facing side of the dustbin 90 so as to prevent removal.

The dustbin may have a variety of differently shaped top openings. Aside from a rectangular opening of FIG. 4, the dustbin may have a trapezoidal opening, as shown in FIG. 5, or a triangular opening, as shown in FIG. 6. Other shapes of the opening of the dustbin 90, as contemplated by one of ordinary skill in the art, may be employed.

Figure 7A:
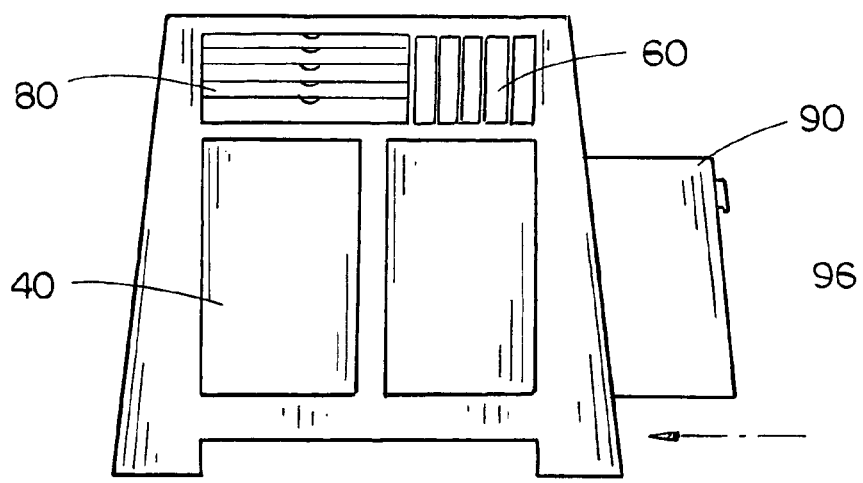
FIGS. 7A, 7B, and 7C illustrate an embodiment of a dustbin that is removable from either of two opposing sides of the cabinet of the present invention.
Figure 7B:
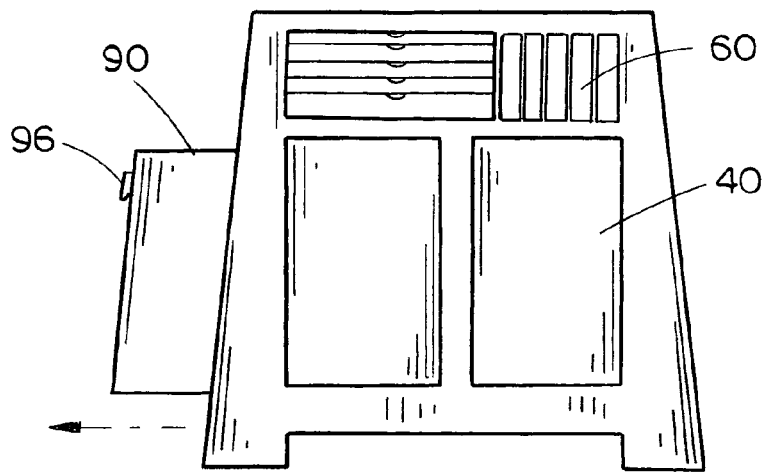
Figure 7C:
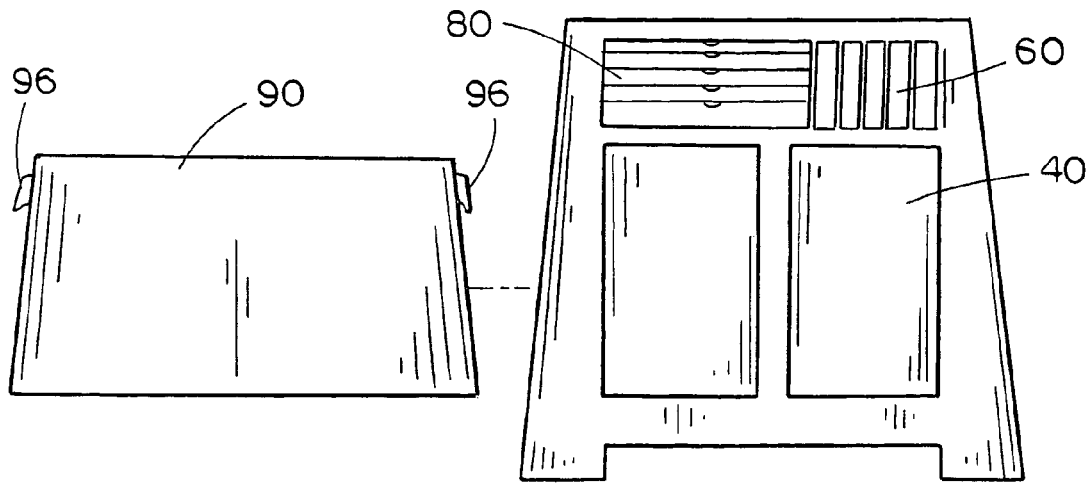

FIGS. 7A, 7B, and 7C illustrate an embodiment of an elongated dustbin 90 that is removable from either of two opposing sides of the cabinet. This arrangement allows greater options in placement of the cabinet since the dustbin is accessible on either of two sides. FIG. 7A shows the dustbin moving from the right side. FIG. 7B shows the dustbin emerging from the left side. FIG. 7C shows the dust bin fully removed from the cabinet. Elongated dustbin 90 may be latchable or lockable on either or both sides.

Instead of direct insertion within the cabinet body, the dustbin may be mounted on a hinged door via hooks or guide rails. Dustbin mounting elements may be made integral with the dustbin or may be attachable to the dustbin. For example, the mounting elements may be supported by adjustable metal bands or jackets that surround the dustbin. The dustbin shape may be cylindrical, rectangular, funnel shaped, or of another suitable shape. Removable bags for collecting dust and debris may be used to line the interior of the dustbin.

Figure 8:
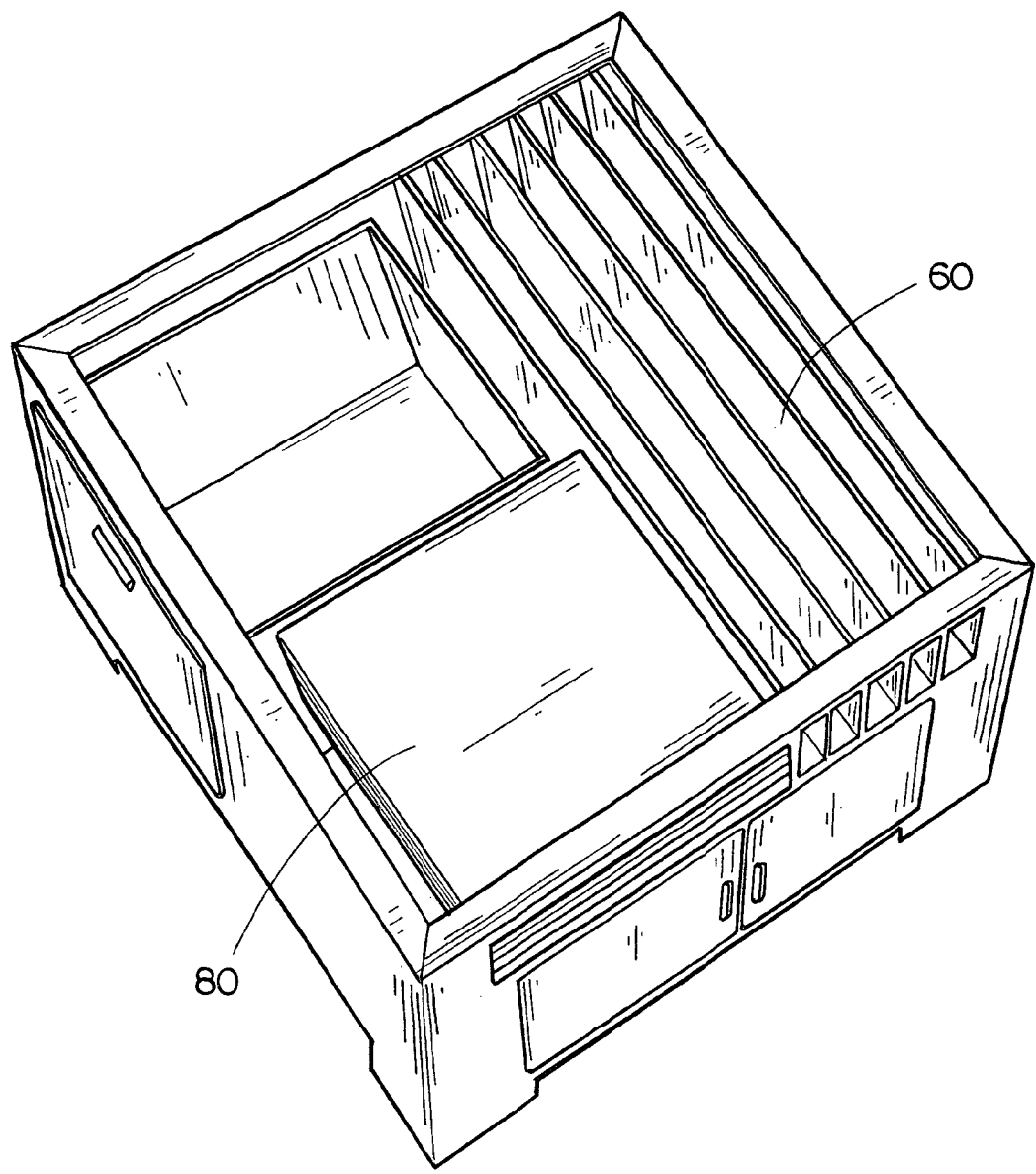
FIG. 8 illustrates a top view of an embodiment of the cabinet of the present invention.

An exemplary embodiment of the cabinet upper level compartments is shown in a top view in FIG. 8. Three upper level compartments include a blade/dado compartment 80, a dustbin receptacle volume 92, and an inserts compartment 60. The arrangement of the compartments may be customized for a particular use. The walls of the inserts compartment may be removable and rearrangeable for customization. Also, the compartments may be provided not only in the front of the cabinet, but also on the sides or at the rear. Furthermore, the number and type of compartments may be configured for a particular use. For instance, a toolbox compartment may be provided. The cabinet may be designed to allow reconfigurability by the customer.

Figure 9:
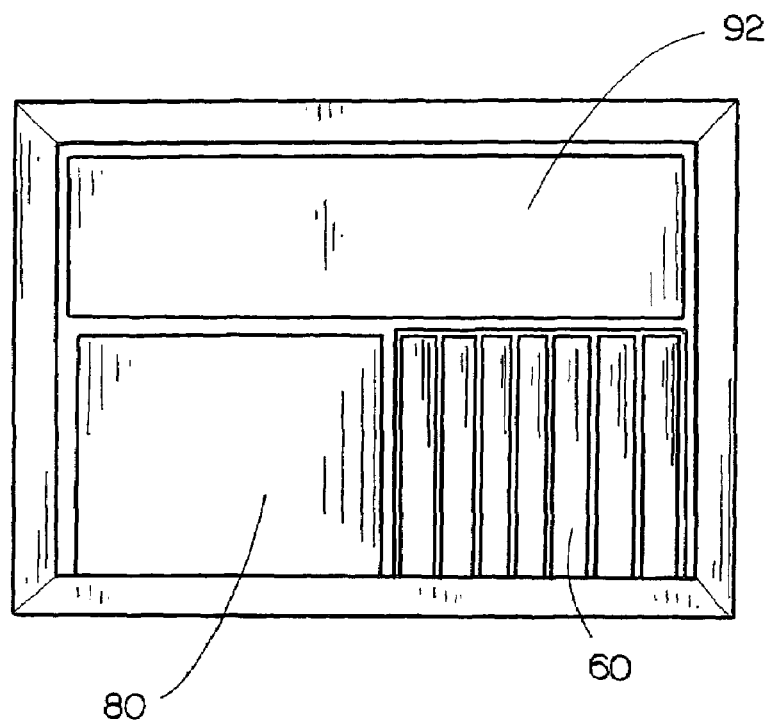
FIGS. 9 and 10 illustrate two embodiments of the upper level storage compartments of the cabinet of the present invention.
Figure 10:
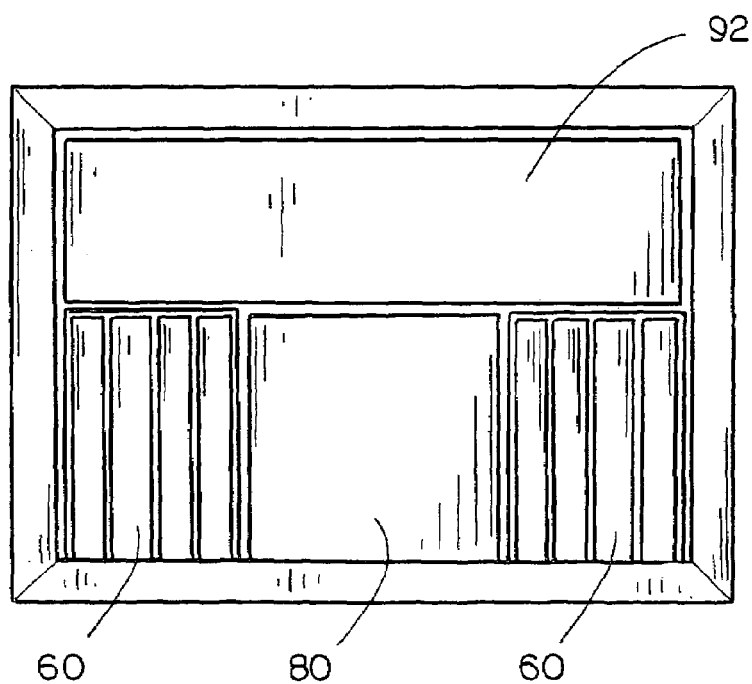

FIGS. 9 and 10 show alternate embodiments of the upper level cabinet compartments. In FIG. 9, the blade/dado storage compartment 80 is disposed at a corner of the upper cabinet, the inserts compartment 60 at another corner of the upper cabinet, and the dust bin opening 92 at the back half of the upper cabinet. In FIG. 10, the blade/dado storage compartment 80 is disposed between inserts compartments 60. Other arrangements are within the scope and spirit of the present invention, including reconfigurable compartments.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A cabinet for supporting a stationary power tool, comprising:

a body having a top portion for supporting the stationary power tool, the stationary power tool being mounted to the top portion for securing the stationary power tool to the body while the stationary power tool performs an operation on a workpiece; and a dustbin received in a chamber disposed in the body for collecting debris generated by the stationary power tool performing the operation on the workpiece, the dustbin including a window for allowing a user to ascertain the amount of debris contained in the dustbin without removing the dustbin from the chamber formed in the body;

wherein the dustbin is removable from chamber formed in the body for removal of the debris from the dustbin.

2. The cabinet as claimed in claim 1, wherein the dustbin slides into and out of the chamber formed in the body.

3. The cabinet as claimed in claim 1, wherein the top portion includes an opening for allowing debris generated by the stationary power tool to drop from the stationary tool into the dustbin.

4. The cabinet as claimed in claim 1, wherein the body includes a front surface and a side surface, the dustbin being removable from the chamber disposed in the body though the side surface.

5. The cabinet as claimed in claim 4, wherein the front surface includes a storage compartment.

6. The cabinet as claimed in claim 5, wherein the body comprises doors for enclosing the storage compartment.

7. A cabinet for supporting a table saw, comprising:

a body having a top portion for supporting the table saw, the base of the table saw being mounted to the top portion or securing the table saw to the body while the table saw performs a cutting operation on a wooden workpiece; and a dustbin received in a chamber disposed in the body for collecting sawdust generated by the table saw performing the cutting operation on the wooden workpiece, the dustbin including a window for allowing a user to ascertain the amount of sawdust contained in the dustbin without removing the dustbin from the chamber formed in the body;

wherein the dustbin is removable from chamber formed in the body for removal of the sawdust from the dustbin.

8. The cabinet as claimed in claim 7, wherein the dustbin slides into and out of the chamber formed in the body.

9. The cabinet as claimed in claim 7, wherein the top portion includes an opening for allowing sawdust generated by the stationary power tool to drop from the stationary tool into the dustbin.

10. The cabinet as claimed in claim 7, wherein the body includes a front surface and a side surface, the dustbin being removable from the chamber disposed in the body through the side surface.

11. The cabinet as claimed in claim 10, wherein the font surface includes a storage compartment.

12. The cabinet as claimed in claim 11, wherein the body comprises doors for enclosing the storage compartment.

13. The cabinet as claimed in claim 1, wherein the stationary power tool comprises a table saw.

* * * * *